(12) United States Patent
Stumpf et al.

(10) Patent No.: US 9,032,001 B2
(45) Date of Patent: May 12, 2015

(54) FIELD TRANSFORMATIONS FOR USER INTERFACE DATA ELEMENTS

(75) Inventors: Dirk Stumpf, Garben-Neudorf (DE); Tim Kornmann, Weisloch (DE); Gerd Ritter, Heidelberg (DE); Rene Gross, Heidelberg (DE)

(73) Assignee: SAP SE, Walldorf (DE)

( * ) Notice: Subject to any disclaimer, the term of this patent is extended or adjusted under 35 U.S.C. 154(b) by 352 days.

(21) Appl. No.: 13/331,039

(22) Filed: Dec. 20, 2011

(65) Prior Publication Data

US 2013/0159356 A1    Jun. 20, 2013

(51) Int. Cl.
*G06F 17/30* (2006.01)
(52) U.S. Cl.
CPC ............... *G06F 17/30398* (2013.01)
(58) Field of Classification Search
CPC ................................................ G06F 17/30398
USPC .......................... 707/809, 810, 811, 805, 807
See application file for complete search history.

(56) References Cited

U.S. PATENT DOCUMENTS

| | | | |
|---|---|---|---|
| 6,990,480 B1 * | 1/2006 | Burt | 1/1 |
| 8,056,000 B2 * | 11/2011 | Vidyarthi et al. | 715/239 |
| 8,438,467 B2 * | 5/2013 | Blain et al. | 715/226 |
| 2009/0089254 A1 * | 4/2009 | Von Kaenel et al. | 707/3 |
| 2012/0284223 A1 * | 11/2012 | Belyy et al. | 707/601 |

\* cited by examiner

*Primary Examiner* — Jorge A Casanova
(74) *Attorney, Agent, or Firm* — Buckley, Maschoff & Talwalkar LLC

(57) ABSTRACT

A method and system, the method may include determining a user interface to be displayed, the user interface including a user interface data element associated with a service input parameter. Information about the service input parameter may be provided to a field transformation as a transformation input, and a transformation output may be received from the field transformation.

21 Claims, 9 Drawing Sheets

FIELD TRANSFORMATIONS FOR USER INTERFACE DATA ELEMENTS

FIELD

Some embodiments relate to user interfaces supported by a business process platform. More specifically, some embodiments relate to field transformations for user interface data elements.

BACKGROUND

A user interface may include various data elements that are displayed to a user. For example, a user interface might display to a user a list of all open purchase orders he or she had submitted during the last 30 days. In this case, certain information will not be available when the user interface is designed. For example, a designer will not know the appropriate dates that should be used to retrieve the open purchase orders. That is, the designer may be aware that open purchase orders "during the last 30 days" should be displayed but he or she will not know that, for example, purchase orders from Jan. 1, 2015 through Jan. 30, 2015 should be displayed (as would be the case if a user accessed the user interface on Jan. 30, 2015). A user could be asked to manually enter the appropriate dates, but such an approach may be inefficient and error prone. As another approach, a designer of the user interface could create code to determine the current date and calculate the date 30 days prior. Creating such code, however, is not trivial and may be inefficient and redundant, especially when similar scenarios (sales orders/purchase orders/bank transfers during last 60/90/ . . . days) are present on many different user interfaces.

Accordingly, an efficient mechanism for representing and implementing user interface data elements may be addressed by some embodiments herein.

DETAILED DESCRIPTION

Figure 1:
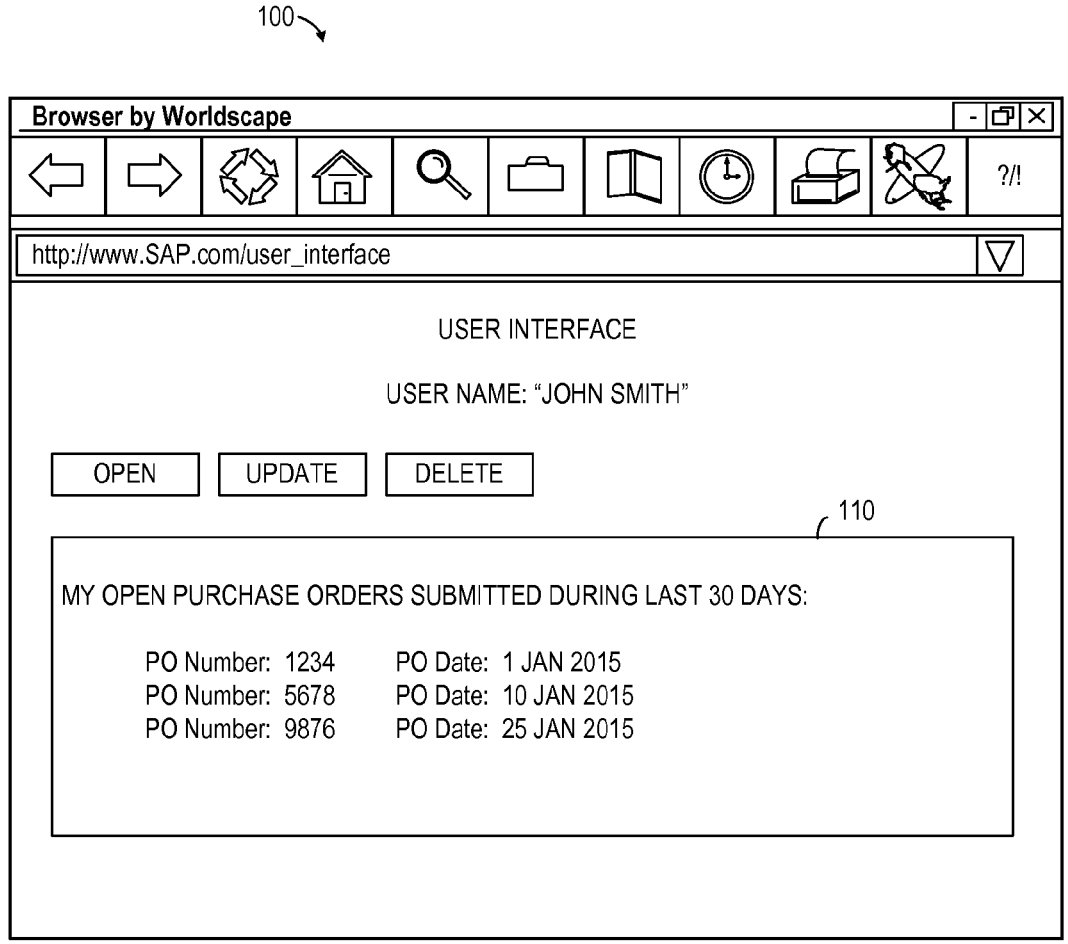
FIG. 1 is an example of a user interface that might be provided in accordance with some embodiments.

A user interface may include various data elements that are displayed to a user. For example, a user interface might display to a user a list of all open purchase orders he or she had submitted during the last 30 days. FIG. 1 is an example of a user interface 100 that might be provided in accordance with some embodiments. In this case, the user interface 100 displays a list 110 of purchase orders that are: (i) currently open, (ii) associated with employee identifier "E_1001", and (iii) were submitted during the last 30 days. Note that certain information will not be available when the user interface 100 was designed. For example, a designer will not know the appropriate dates that should be used to retrieve the open purchase orders. That is, the designer may be aware that open purchase orders "during the last 30 days" should be displayed but he or she will not know that, for example, purchase orders from Jan. 1, 2015 through Jan. 30, 2015 should be displayed (as would be the case if a user accessed the user interface on Jan. 30, 2015 in the user interface 100 of FIG. 1). A user could be asked to manually enter the appropriate dates, but such an approach may be inefficient and error prone. As another approach, a designer of the user interface 100 could create code to determine the current date and calculate the date 30 days prior to generate the list 110. Creating such code, however, is not trivial as it requires knowledge such as about how to convert data types (e.g., a duration into start/end date and vice versa) while considering localization aspects. Furthermore it may be inefficient and redundant, especially when similar data elements to be converted using the same pattern (e.g., the list 110) are present on many different user interfaces.

This example may not only select and display data according to a certain time period but may also be associated with a particular person. Note that a person may have different representations such as a display name ("John Smith"), an employee number ("E_1001"), and a system logon name ("smithj1"). The assignment of other entities (Sales Orders, Purchase Orders, . . . ) to an employee is typically done using an employee number. Thus, obtaining "My Sales Order of the last 30 days" might require not only a period-to-start/end date conversion but also another conversion that translates a logon name into an appropriate employee number.

Another conversion might translate a human readable status code ("approved", "rejected", "delivered", . . . ) into a corresponding internal code ("01", "02", . . . ), and a user interface designer may easily parameterize a service in a way that delivers a desired result set. In the given example, three transformations might each receive one inbound parameter. The transformation output may be filled into the service parameters as defined by the UI designer ("My" into "E_1001", "30 days" into "2011/01/01-2011/01/30", and "approved" into "01").

Figure 2:
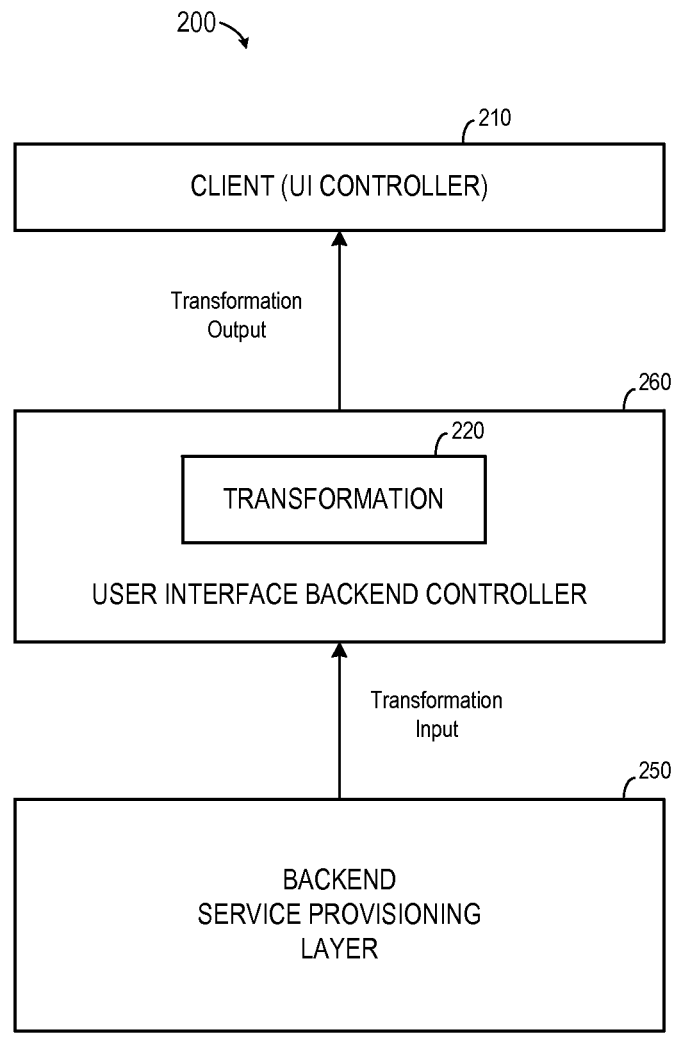
FIG. 2 is a block diagram of an operating environment suitable for supporting various aspects of the present disclosure.

Accordingly, an efficient mechanism for representing and implementing user interface data elements may be addressed by some embodiments herein. In particular, FIG. 2 is a block diagram of an operating environment 200 suitable for supporting various aspects of the present disclosure. The environment 200 includes a client 210 with a user interface controller supported by a backend service provisioning layer 250.

The environment 200 is further associated with a field transformation 220 between the backend 250 and client 210. Generally, the field transformation 220 may be an artifact used to transform n given source fields into m target fields. Moreover, the transformation 220 might do various kinds of data aggregation and calculation functions. For example, the transformation 220 might retrieve meta data and business data from other services (and also from the user interface) to facilitate these calculations. Note that such field transformations today in general are used for transforming fields for a data presentation. Thus, the transformation happens when information is prepared to be displayed and/or transported to the client 210 for a consumer (e.g., transforming fields to output forms and tables).

According to some embodiments described herein, the field transformation 220 may in addition be used to support a user interface data element, such as by being included in a re-usable library associated with a user interface query, action, or default set parameters. According to some embodiments, data elements and transformations may comprise separate, re-usable entities residing in dedicated libraries. For example, there might be 20 types and flavors of a DateTime data element. Moreover, there might be 20 transformations that perform conversions with such DateTime data elements. A UI designer may bind pairs of data elements and transformations together, on transformation inbound as well as on outbound sides, so that a final data element processing chain appears as desired (e.g., Duration-to-DateTime). Moreover, the field transformation 220 may support various transformation properties, such as cardinality, bi-directionality, and in/outbound types.

Figure 3:
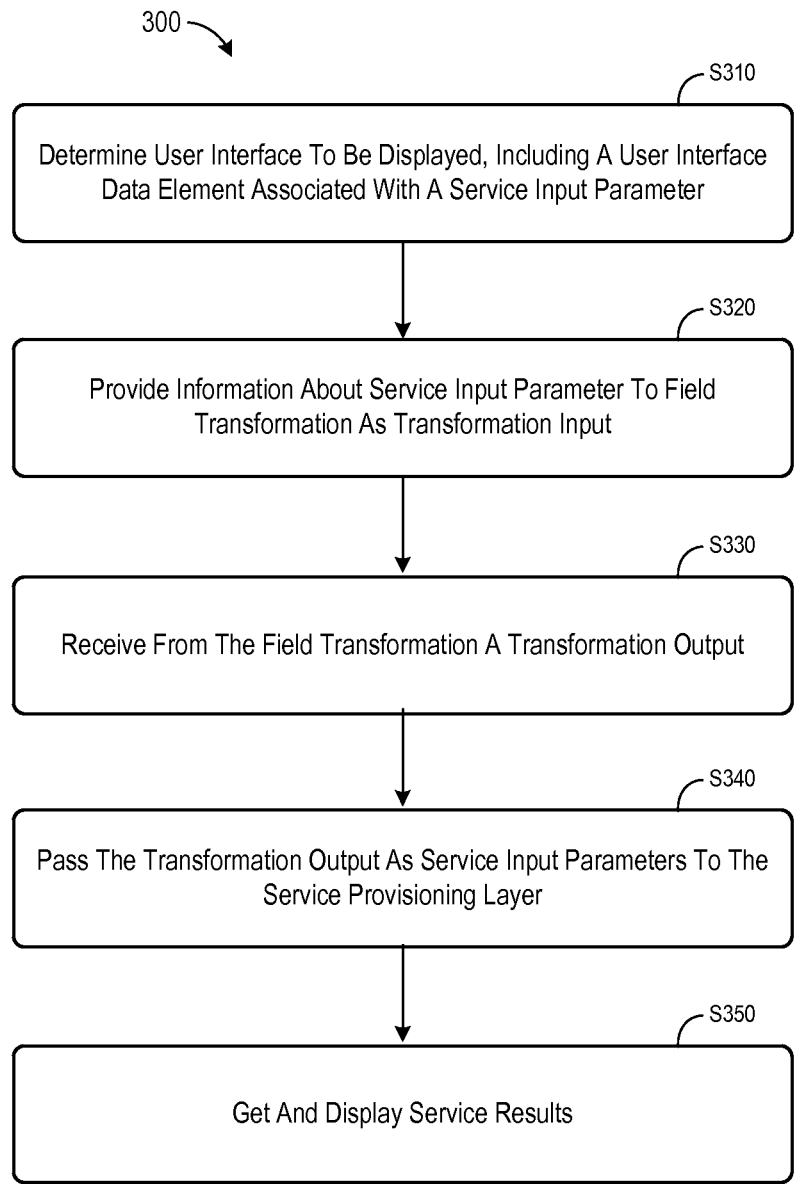
FIG. 3 is a flow diagram illustrating various aspects of the present disclosure, in accordance with some embodiments.

Consider, for example, FIG. 3 which illustrates a method that might be performed, for example, by some or all of the elements of the environment 200 described with respect to FIG. 2 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a user interface to be displayed may be determined, the user interface including a user interface data element associated with a service input parameter. The user interface data element might, according to some embodiments, comprise a default set parameter. According to some embodiments, the phrase "default set" may refer to a set of predefined parameter values for a distinct data query service. A default set may, for example, deliver favorite query result lists, such as "My Sales Orders during last 30 days", "All open Orders", "Orders with approval pending longer than 10 days". For example, the service input parameter might be associated with a date, a number of days, an employee identifier, or a set of employee identifiers. According to some embodiments, the user interface data element comprises a query parameter such as a query parameter that includes a search parameter resolved at run time. According to still other embodiments, the user interface data element comprises an action parameter.

At S320, information about the service input parameter may be provided to a field transformation as a transformation input, and a transformation output may be received from the field transformation at S330. At S340, the transformation output may be passed to a service. For example, the transformation output may be passed as a service input parameter to a service provisioning layer in connection with a query service, an action service, and/or a value help service. At S350, the service is executed and a service response is sent to client side and displayed within the user interface. Note that the field transformation may be included in a field transformation library accessible by a plurality of user interfaces. For example, metadata about transformations, their inbound and outbound signature, their cardinality, and/or whether they are bi-directional may be stored in a meta data library such as a Meta Data Repository System ("MDRS"). Moreover, the field transformation may be executed by a separate service provisioning layer (such as the user interface backend controller 260 of FIG. 2) at run time and be defined by a transformation interface designer and development tool. The user interface designer may, for example, select an appropriate transformation from the transformation library and binds it to its user interface data elements.

Note that a similar process may be performed in reverse order. For example, while initializing an input parameter screen for an action/query/value help, the client user interface controller may request that the belonging backend service send default values for these input parameters. The backend (query/action/default set) service may then calculate the default input parameters depending on, for example, system customizing, user preferences, localizations, etc., and send them back to client side. According to some embodiments, the client side cannot display certain values since the data type of the user interface field has changed according to the transformation's inbound type (e.g., it was changed from date to duration). Thus, the transformation may be capable of converting the service default value into the user interface field typed value.

According to some embodiments, a user interface designer tool may adapt a user interface control used for presenting a service input parameter according to an associated transformation. For example, a date input field may usually be represented by a calendar control, but when the field is associated with a transformation that expects a duration on the inbound side a time period selection control may be displayed instead.

Thus, embodiments may provide field transformations that may be used for service input parameters associated with action, query, and default set calls. Note that the input parameters may be sent from a client to a service provisioning layer and also in the opposite direction (e.g., because the parameters might have default values that may be sent from the backend to the client side).

Figure 4:
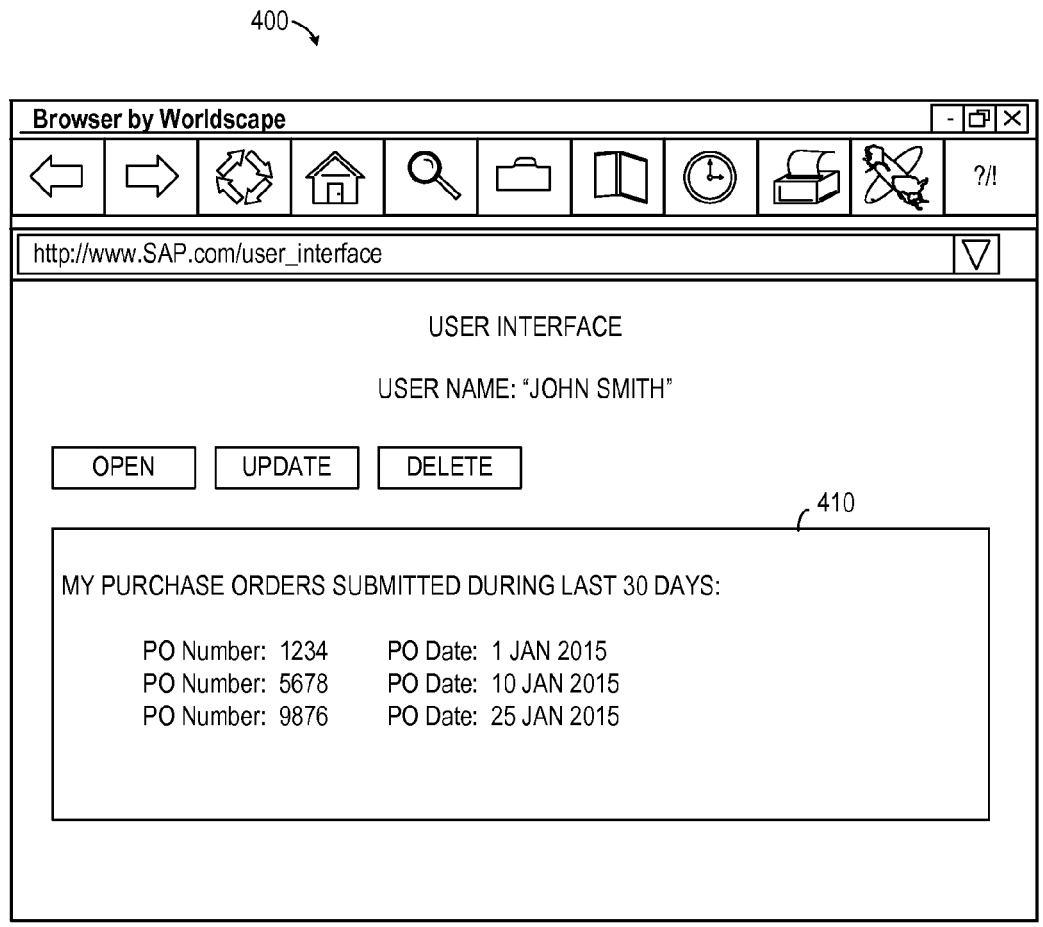
FIG. 4 illustrates a user interface display populated via a field transformation in accordance with some embodiments.
Figure 4:
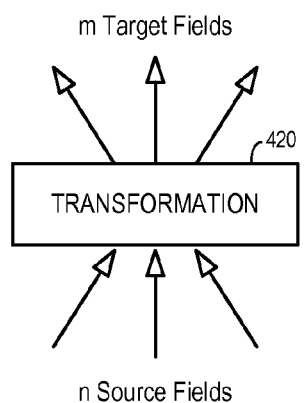

Thus, in addition to using transformations for structures and lists, embodiments described herein may tailor query, action, and default set parameters according to the needs of a given end user interface scenario. For example, FIG. 4 illustrates a user interface display 400 that includes a list 410 populated via a field transformation 420 having n source fields and m target fields in accordance with some embodiments. In this way, a default set such as the list 410 of "My Open Purchase Orders Submitted During the Last 30 Days" may be implemented as a query in a convenient way without needing major programming changes (instead, the transformation 420 may be applied to the query input parameters). According to some embodiments, an existing query may be used which has m+x input parameters. The query may transform n default Set parameters (e.g., "My," "30 Days," and "Submitted") into m query input parameters. The query may have x other input parameters that stay blank in the given example and this may, for example, simply imply a wildcard semantics for these parameters.

Figure 5:
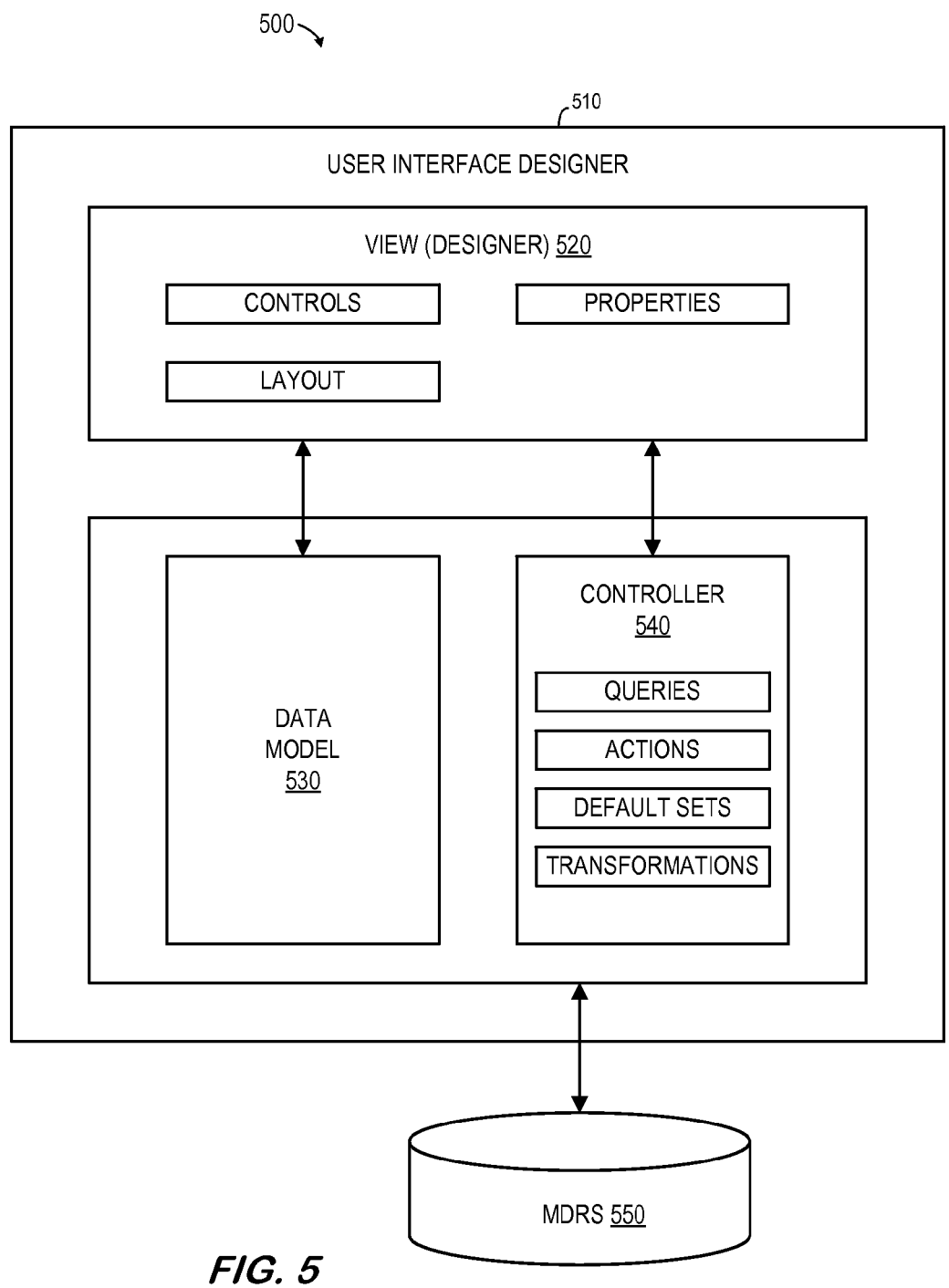
FIG. 5 is a detailed block diagram of a design time system according to some embodiments.

FIG. 5 is a detailed block diagram of a design time system 500 according to some embodiments. The system 500 includes user interface designer 510 having a view component 520 that may be used by a designer who is creating a user interface. The view component 520 may, for example, implement controls, layout, properties, and/or calculation rules for a user interface. According to some embodiments, transformations may be created in a completely model-driven way in the same user interface designer tool. Moreover, such transformations may, according to some embodiments, comprise reuse entities which are kept separately to be used by various user interfaces. According to some embodiments, designing functions may be associated with the controller and stored into a separate repository (e.g., the MDRS). The view component 520 may interact with a data model 530 and controller 540. The data model 530 may, for example, perform business object binding and adaptation functions. The controller 540 may, for example, include event and message handling for the system 500. According to some embodiments, the view component 520 may define and/or access field transformation stored in a MDRS library 550.

Figure 6:
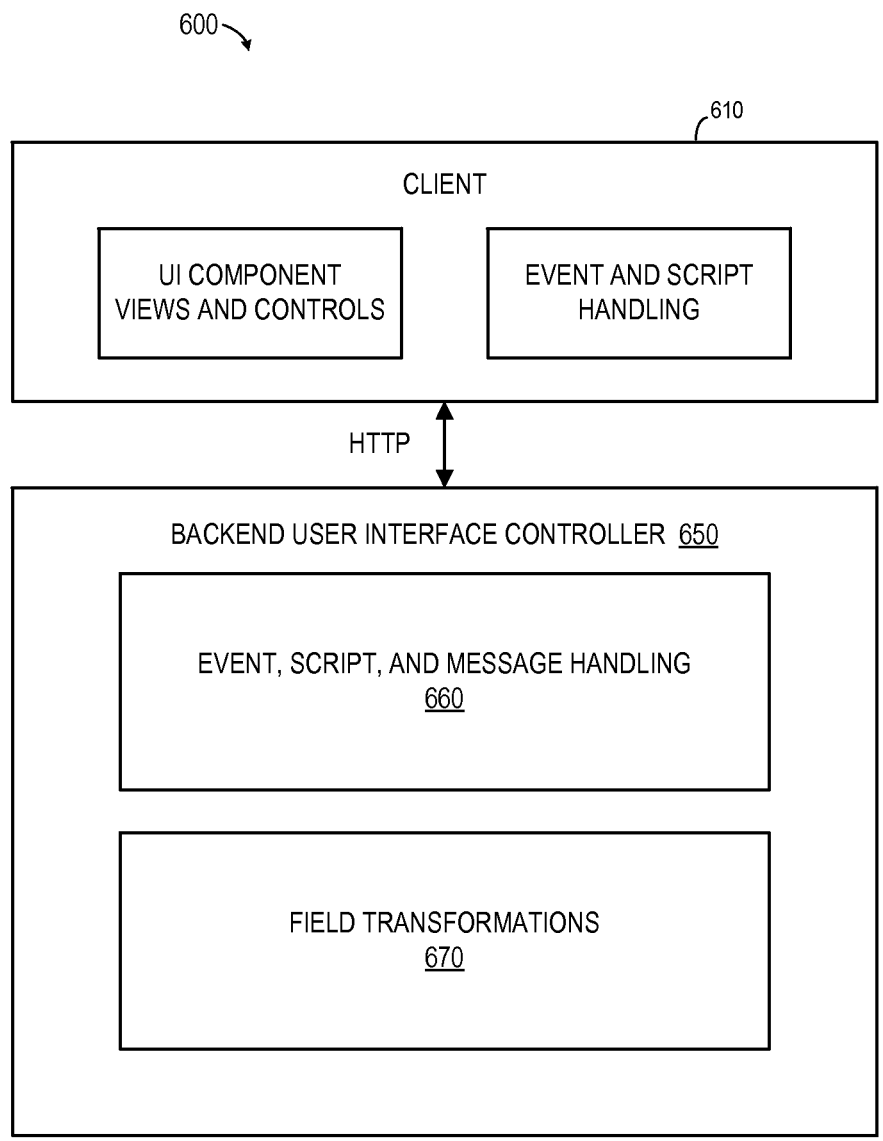
FIG. 6 is a detailed block diagram of a run time system according to some embodiments.

FIG. 6 is a detailed block diagram of a run time system 600 according to some embodiments. The system 600 includes a client 610 that communicates with an advanced user interface Controller layer on backend side 650 via an exchange of HyperText Transfer Protocol ("HTTP") information or any other appropriate protocol. The client 610 may, for example, include a user interface component including multiple views, controls, and/or embedded user interface components. The client 610 may further implement event and script handling during run time. The backend user interface controller 650 may support event, script, and/or message handling 660 as well as field transformations 670 during run time.

Thus, embodiments may provide field transformations not only when reading data into tables and structures but also when filling query and/or action input parameters. Some user interface logic may be implemented via sophisticated controller logic in scripts. Note, however, that such sophisticated controller logic use cases might instead be handled by generic implementations since they are implemented widely and are based on the same business objects in different user interface controllers. Consider, for example, a default set that will display a particular user's Sales Orders, Purchase Orders, Projects, etc. For this particular use case, each user interface may execute a conversion from the user's name or login to a global employee identifier which then in turn gets added as query parameter to an underlying query call. This feature might instead, according to some embodiments be provided by a transformation definition which has the user name as an input and the employee identifier as an output. This field transformation could then be registered and used in default set query parameter settings.

Thus, many generic use cases may be covered by transformation definitions which can avoid implementing the use cases repeatedly in user interface implementations. Such use cases may include, for example, query parameters, default set parameters, advanced search parameters (e.g., fields in search masks), value help parameters (e.g., input parameters for services that provide value help on fields, such as country codes, currency code, measurement units, or product identifiers), action parameters, and/or default node, query, and/or action values. According to some embodiments, designer capabilities may be provided for assigning field transformations to the appropriate input and/or output parameters. Subsequently, this information may be conveyed into the user interface meta data load. Depending on where the transformation is executed, this may comprise a Semantic Application Design Language ("SADL") query.

Figure 7:
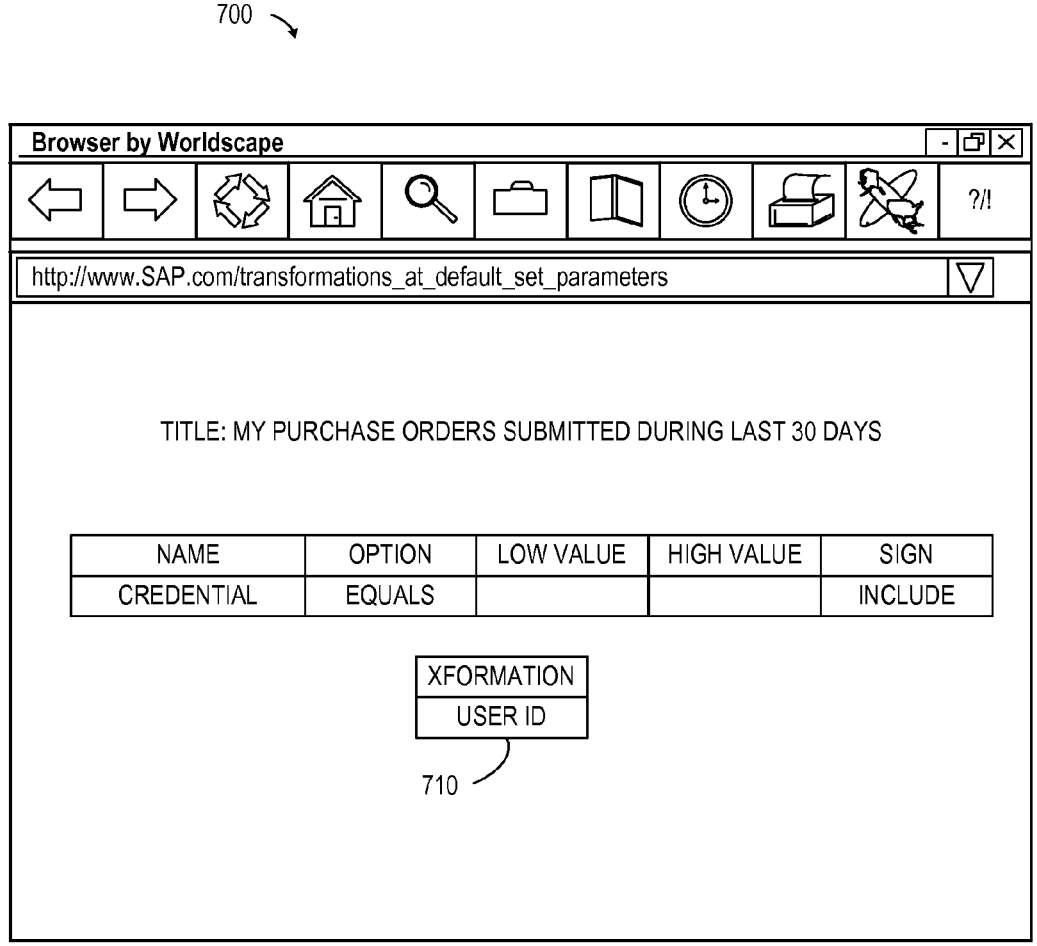
FIG. 7 illustrates a transformation with a default set parameter according to some embodiments.

FIG. 7 illustrates a design time display 700 a transformation with a default set parameter according to some embodiments. In particular, a default set parameter (which corresponds to a "User ID" query input parameter) is being defined 710. Note that such an implementation may not require a specific low or high value but only has a transformation assigned (from "Credential," such as a user name, to "User ID"). Note that such a transformation may not expect any input but instead calculates the User ID from the existing credential. At runtime, when this default set is executed on backend user interface controller side, the transformation may be called and its output is passed to the User ID input field of the belonging query service.

Figure 8:
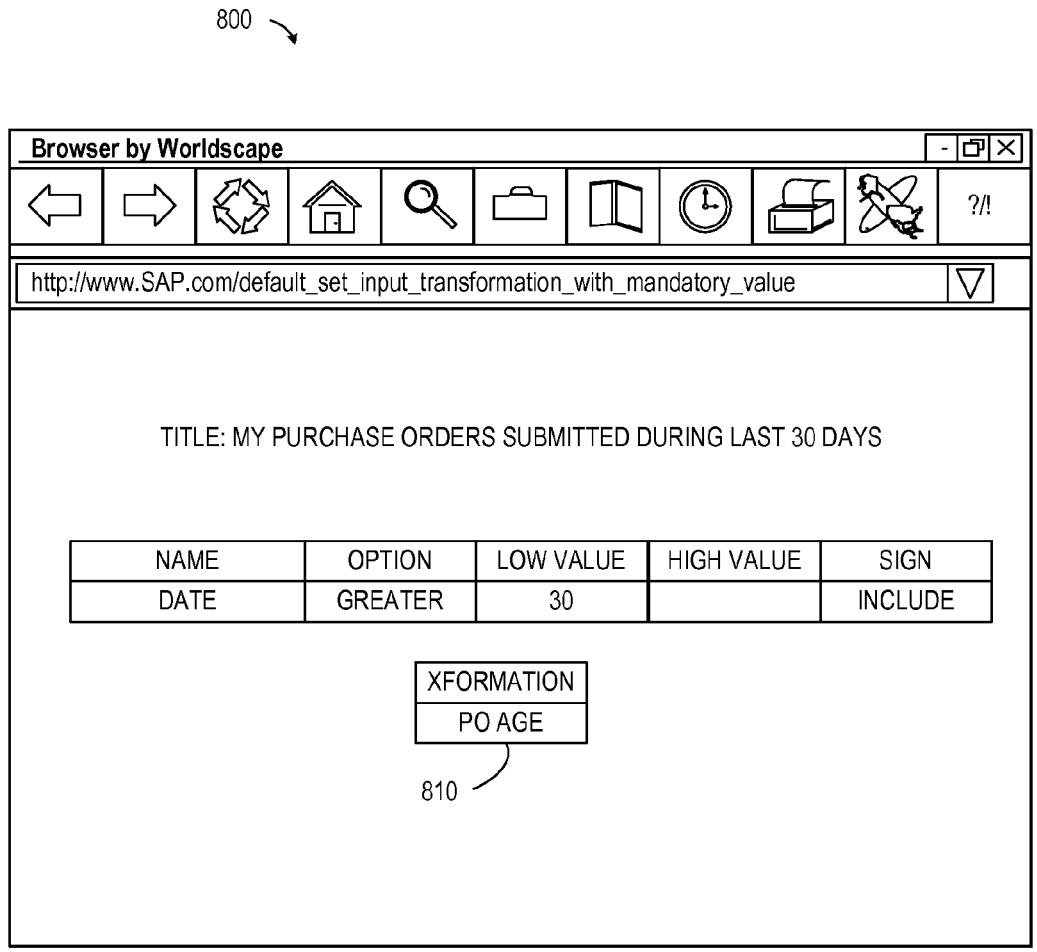
FIG. 8 illustrates a default set input transformation with a mandatory value according to some embodiments.

According to some embodiments, only a 0-to-1 or a 1-to-1 transformation might be supported to keep the implementation relatively simple. Depending on the transformation definition, empty inbound values may be allowed. For some transformations, however, a particular value might be mandatory. For example, FIG. 8 illustrates a design time display 800 for a default set input transformation having a mandatory value according to some embodiments. The display 800 is associated with a transformation assigned to a default set select option that expects a number of calendar days as an input value and calculates a past date based on that value and the current date. Note that a low value of "30" days may need to be specified for a transformation that outputs a list of purchase orders aged greater than 30 days. According to some embodiments, meta data may be available in a MDRS upon a signature definition of a transformation (e.g., associated with a multiplicity of inbound and outbound parameters).

Note that creating a transformation for a default set select option may be different as compared to creating a transformation for a data field of a structure or a list. For example, it may not have a number of bindings against arbitrary fields in the user interface model for its input parameters. Moreover, the transformation might be limited to 0 or 1 constant input parameter and the output parameter might always be placed into the option's low value. Thus, tooling in a user interface designer tool may support the user accordingly when defining such a transformation. In order to enable such tooling, a flag may be provided to indicate the type of transformation. As a result, the user might be limited to only bind 1 parameter of a given transformation (and, according to some embodiments, may only use constant values).

For example, there may be a request to have different default sets for the same query that deliver results such as "My(SalesOrders/Products/ . . . ) of the last 30/60/90 days." Instead of immediately implementing a script to support the request, an alternative solution could be to use a set of re-useable transformations for this purpose. In most cases, the query will have the input parameters that allow the before mentioned combinations by having a 1-to-1 transformation (e.g., based on a conversion of a name to a global employee identifier or from a current date to a calculated end date). The following might be associated with a default set parameter type by way of example:

```
<xs:complexType name="SelectOptionType">
    <xs:complexContent>
        <xs:extension base="base:ModelEntity">
            <xs:attribute name="option"
            type="SelectOptionOptionType"
                default="containsPattern" use="optional"/>
            <xs:attribute name="low" type="xs:string"
            use="required"/>
            <xs:attribute name="high" type="xs:string"
            use="optional"/>
            <xs:attribute name="sign" type="SelectOptionSignType"
                default="include" use="optional"/>
            <xs:attribute name="transformationId" type="xs:string"
                use="optional"/>
        </xs:extension>
    </xs:complexContent>
</xs:complexType>
```

To help a user interface designer distinguish between creating a data field bound transformation vs. a default set parameter bound transformation a "TransformationType-Types" may be introduced:

```
<xs:simpleType name="TransformationTypeTypes">
    <xs:restriction base="xs:string">
```

-continued

```
        <xs:enumeration value="DataField"/>
        <xs:enumeration value="DefaultSetParameter"/>
    </xs:restriction>
</xs:simpleType>
```

Note that a screen for creating transformations on default set parameters in a user interface design tool might look a bit different as compared to when creating transformations for structures and/or lists. For example, the different layouts may be switched using TransformationTypeTypes. For default set parameters, it may not be possible to bind any user interface data fields as source fields (instead, one may only define constant values). Moreover, on the target side a designer might be unable to assign a user interface data field to a transformation output parameter (because it may always be passed using a "low" value of the default set parameter).

A procedure to define transformations on advanced search query and action input parameters may also be different as compared to default set parameters. Note that such a procedure may be relatively similar to how transformations may be defined for data fields of structures and lists. Consider, for example, a user interface design tool in a user interface data mode where such a query or action input data fields may have:
    Query/Action Parameter Binding="true" (this may be associated with a data field on an action or query parameter input screen)
    Binding Status="OK" (the field may be bound against its query/action input parameter target field)
    Field Transformation="MyQueryInputFieldTransformaton" (the value right is not passed directly to the action/query service but is instead first passed to the transformation)

In the user interface designer's controller part "MyQueryInputFieldTransformation" may have been defined such that a belonging query parameter data field was both a transformation input and a transformation output.

Thus, a user input for this field may be passed to the transformation and the transformation result may be put into the data field again before the query is executed. To better help a user, a new transformation type (query/action input) could be introduced. The transformation type could, for example, restrict input and target fields such that they are associated with appropriate query/action input fields according to some embodiments.

In some cases, a 1-to-n transformation may be appropriate and a re-use character may be extended to support transforming a query input source field or default set parameter into n target query input fields. In addition, such input fields will not necessarily be part of the query input structure but might be dedicated (user interface only) fields.

Figure 9:
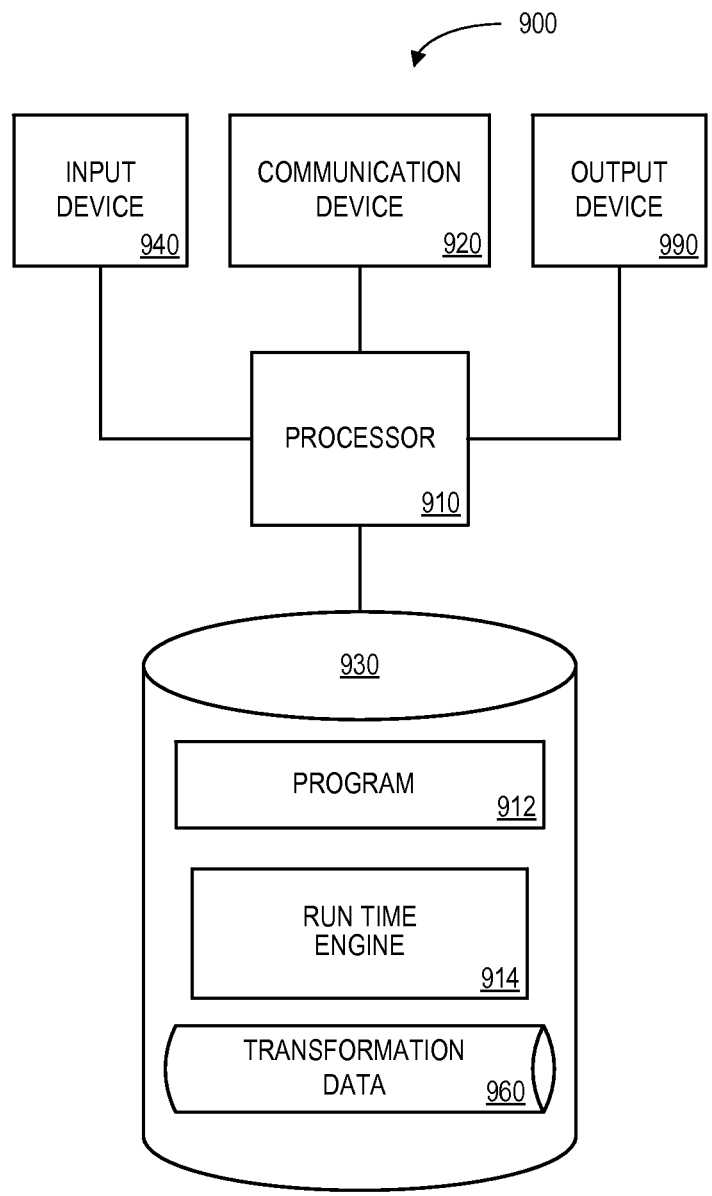
FIG. 9 is a detailed block diagram of a platform according to some embodiments.

The processes described herein may be performed by any suitable device or apparatus. FIG. 9 is one example of a platform 900 according to some embodiments. The platform 900 may be, for example, associated with the environment 200 of FIG. 2. The platform 900 comprises a processor 910, such as one or more commercially available Central Processing Units (CPUs) in the form of one-chip microprocessors, coupled to a communication device 920 configured to communicate via a communication network (not shown in FIG. 9). The communication device 920 may be used to communicate, for example, with one or more remote devices. The platform 900 further includes an input device 940 (e.g., a mouse and/or keyboard to enter field transformation definitions) and an output device 950 (e.g., a computer monitor to display user interface design tools and user interfaces).

The processor 910 also communicates with a storage device 930. The storage device 930 may comprise any appropriate information storage device, including combinations of magnetic storage devices (e.g., a hard disk drive), optical storage devices, and/or semiconductor memory devices. The storage device 930 stores a program 912 and/or run time engine 914 for controlling the processor 910. The processor 910 performs instructions of the programs 912, 914, and thereby operates in accordance with any of the embodiments described herein. For example, the processor 910 may determine a user interface to be displayed, the user interface including a user interface data element associated with a service input parameter. The processor 910 may also provide information about the service input parameter to a field transformation as a transformation input and received from the field transformation a transformation output. According to some embodiments, the processor 910 may also display the user interface data element in accordance with the transformation output received from the field transformation.

The programs 912, 914 may be stored in a compressed, uncompiled and/or encrypted format. The programs 912, 914 may furthermore include other program elements, such as an operating system, a database management system, and/or device drivers used by the processor 910 to interface with peripheral devices. As used herein, information may be "received" by or "transmitted" to, for example: (i) the platform 900 from another device; or (ii) a software application or module within the platform 900 from another software application, module, or any other source.

In some embodiments (such as shown in FIG. 9), the storage device 930 stores transformation data. The transformation data may, for example, comprise a database that defines n source fields, m target fields, and appropriate calculations between those fields in connection with user interface data elements. Note that the database mentioned herein is only one example, and additional and/or different information may be stored therein. Moreover, various databases might be split or combined in accordance with any of the embodiments described herein.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and user interface configurations have been described herein, note that any number of other configurations may be provided in accordance with embodiments of the present invention (e.g., the user interface definition tools may be presented in other formats). Applicants have discovered that embodiments described herein may be particularly useful in connection with certain types of user interface data elements. Note, however, that other types of user interface data elements may also benefit from the invention. [OK]

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer implemented method, the method comprising:

determining a user interface to be displayed, the user interface including a user interface data element associated with a service input parameter, the user interface data element bound to a field transformation from a transformation library associated with a backend service;

providing information about the service input parameter to the field transformation as a transformation input, the field transformation included in the transformation library and associated with a bi-directional transformation property, the bi-directional transformation property associated with (i) requesting a default value for the service input parameter from the backend service while initializing an input parameter screen associated with the user interface, the backend service calculating the default value for the service input parameter based on the transformation library and (ii) receiving the default value for the service input parameter from the backend service;

receiving from the field transformation a transformation output; and passing the transformation output to a service.

2. The method of claim 1, further comprising:
receiving a result from the service; and
displaying the result.

3. The method of claim 1, wherein the service is associated with at least one of: (i) a query service, (ii) an action service, or (iii) a value help service.

4. The method of claim 1, wherein a user interface designer tool adapts a user interface control used for presenting a service input parameter according to an associated transformation.

5. The method of claim 1, wherein the user interface data element comprises a default set parameter.

6. The method of claim 1, wherein the user interface data element comprises a query parameter.

7. The method of claim 6, wherein the query parameter includes a search parameter resolved at run time.

8. The method of claim 1, wherein the user interface data element comprises an action parameter.

9. The method of claim 1, wherein the field transformation library accessible by a plurality of user interfaces.

10. The method of claim 1, wherein the field transformation is executed by a service provisioning layer at run time.

11. The method of claim 10, wherein the field transformation is defined by a user interface designer tool at design time.

12. The method of claim 1, further comprising:
converting the default value into a user interface field typed value.

13. The method of claim 1, wherein the field transformation accesses at least one of meta-data or business data from another service.

14. A system comprising:
a run time client platform including a user interface component to display a user interface including a user interface data element associated with a service input parameter, the user interface data element bound to a field transformation from a transformation library associated with a backend service; and
a run time backend service provisioning layer platform comprising the transformation library and a computer processor, wherein information about the service input parameter is provided to the field transformation as a transformation input by (i) requesting a default value for the service input parameter from the backend service while initializing an input parameter screen associated with the user interface, the backend service calculating the default value for the service input parameter and (ii) receiving the default value for the service input parameter from the back end service based on the transformation library, via the computer processor wherein the field transformation is associated with a bi-directional transformation property, a transformation output is received from the field transformation, and the user interface data element is displayed in accordance with the transformation output received from the field transformation.

15. The system of claim 14, wherein the user interface data element comprises a query parameter including a search parameter resolved at run time.

16. The system of claim 14, wherein the user interface data element comprises an action parameter.

17. The system of claim 14, further comprising:
a transformation library storing a plurality of field transformations accessible by a plurality of user interfaces.

18. The system of claim 14, further comprising:
a design time user interface design tool to define the field transformation for the user interface data element.

19. A non-transitory, computer-readable medium storing program code executable by a computer processor to perform a method, wherein execution of the code causes the computer processor to:
determine a user interface to be displayed, the user interface including a user interface data element associated with a service input parameter, the user interface data element bound to a field transformation from a transformation library associated with a backend service;
provide information about the service input parameter to the field transformation as a transformation input, the field transformation included in the transformation library and associated with a bi-directional transformation property, the bi-directional transformation property associated with (i) requesting a default value for the service input parameter from a backend service while initializing an input parameter screen associated with the user interface, the backend service calculating the default value for the service input parameter based on the transformation library and (ii) receiving the default value for the service input parameter from the back end service;
receive from the field transformation a transformation output; and
display the user interface data element in accordance with the transformation output received from the field transformation.

20. The medium of claim 19, wherein the user interface data element comprises a query parameter including a search parameter resolved at run time.

21. The medium of claim 19, wherein the user interface data element comprises an action parameter.

* * * * *